US006225417B1

(12) United States Patent
Imashiro et al.

(10) Patent No.: US 6,225,417 B1
(45) Date of Patent: May 1, 2001

(54) ONE-PACK TYPE EPOXY RESIN COMPOSITION

(75) Inventors: Yasuo Imashiro; Takahiko Ito; Hideshi Tomita; Norimasa Nakamura, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/361,303

(22) Filed: Jul. 27, 1999

(30) Foreign Application Priority Data

Aug. 26, 1998 (JP) .................................................. 10-239958

(51) Int. Cl.$^7$ ............................ C08L 63/02; C08L 63/04; C08L 79/00
(52) U.S. Cl. ............................................ 525/452; 525/528

(58) Field of Search ...................................... 525/452, 528

(56) References Cited

U.S. PATENT DOCUMENTS 5,576,398 * 11/1996 Takahashi et al. .................... 525/528
6,103,836 * 8/2000 Imashiro et al. ...................... 525/453

* cited by examiner

*Primary Examiner*—Robert E. L. Sellers
(74) *Attorney, Agent, or Firm*—Kubovcik & Kubovcik

(57) ABSTRACT

The present invention provides a one-pack type epoxy resin composition comprising an epoxy resin having at least two epoxy groups in the molecule and a polyguanidine. The one-pack type epoxy resin composition has high storage stability, can be made into a film, is curable at relatively low temperatures, and has high adhesivity.

3 Claims, No Drawings

ONE-PACK TYPE EPOXY RESIN COMPOSITION

BACKGROUND OF THE INVENTION

1. Field of the Invention

The present invention relates to a one-pack type epoxy resin composition. More particularly, the present invention relates to a one-pack type epoxy resin composition which has high storage stability, which can be made into a film, which is curable at relatively low temperatures, and which has high adhesivity.

2. Description of the Prior Art

The epoxy resin composition used mainly as an adhesive or, in some cases, as a molding material includes (1) a two-pack type epoxy resin composition wherein an epoxy resin (a main component) and a curing agent are prepared separately and, when the composition is used, are mixed and (2) a one-pack type epoxy resin composition which is a mixture of an epoxy resin (a main component) and a curing agent.

In the two-pack type epoxy resin composition, the epoxy resin (a main component) and the curing agent must be accurately measured and mixed when the composition is used; therefore, a measurement error is apt to occur, and the quick reaction between the epoxy resin and the curing agent allows no storage after mixing of the two components.

Meanwhile, in the one-pack type epoxy resin composition which is a mixture of an epoxy resin (a main component) and a curing agent, there are no problems such as mentioned above; however, commencement of a reaction of the epoxy resin with the curing agent and subsequent curing, and resultant reduction in the storage stability of the composition are anticipated. Therefore, various proposals have been made to suppress the reaction of the epoxy resin with the curing agent when the composition is in storage.

As one-pack type epoxy resin compositions having high storage stability, there is generally known a one-pack type epoxy resin composition using dicyandiamide as the curing agent; and there is also known a one-pack type epoxy resin composition using an imidazole as the curing agent.

Also, as one-pack type epoxy resin compositions having good storage stability, there are known, for example, a composition comprising an epoxy resin and a phenol having at least two functional groups (JP-A-8-183835); a composition comprising an epoxy resin and a carbodiimide (JP-A-5-320611); and a composition comprising an epoxy resin, a curing agent (e.g. dicyandiamide, phenol or acid anhydride) and guanidine as a curing accelerator (JP-A-60-28424).

The above proposals, however, have respective problems. The dicyandiamide has a high melting point of 200° C. or higher and therefore must be dispersed in an epoxy resin in a solid state, and the resulting epoxy resin composition inevitably gives rise to nonuniform curing; when the dicyandiamide is used by being dissolved in a solvent, the resulting composition gives rise to uniform curing but has inferior storage stability.

The imidazole has high reactivity and gives an epoxy resin composition of very low storage stability when having a low melting point and, when having a high melting point, gives a composition of improved but still insufficient storage stability and moreover has the same problems as the dicyandiamide does.

Meanwhile, the one-pack type epoxy resin composition comprising an epoxy resin and a phenol and the one-pack type epoxy resin composition comprising an epoxy resin and a carbodiimide have good storage stability as mentioned in the above-mentioned literatures but require a relatively high temperature of 180° C. for curing.

Further, the one-pack type epoxy resin composition comprising an epoxy resin, a curing agent (e.g. Dicyandiamide and the like) and guanidine as a curing accelerator, similarly to the above compositions comprising a phenol or a carbodiimide, requires a relatively high temperature for curing; moreover, the composition has no film-formability and cannot be handled as a film-shaped composition.

SUMMARY OF THE INVENTION

The present invention aims at alleviating the above-mentioned problems of the prior art and providing a one-pack type epoxy resin composition which has high storage stability, which can be made into a film, which can be cured at relatively low temperatures, and which has high adhesivity.

According to the present invention, there is provided a one-pack type epoxy resin composition comprising an epoxy resin having at least two epoxy groups in the molecule and a polyguanidine.

DETAILED DESCRIPTION OF THE INVENTION

The present invention is hereinafter described in detail.

AS the epoxy resin used in the present invention, there can be mentioned epoxy resins having at least two epoxy groups in the molecule, such as glycidyl ether type epoxy resins (e.g. bisphenol A type epoxy resin, bisphenol F type epoxy resin, phenolic novolac type epoxy resin and cresol novolac type epoxy resin), alicyclic epoxy resins, glycidyl ester type epoxy resins, heterocyclic epoxy resins, liquid rubber-modified epoxy resins and the like. They can be used singly or in admixture thereof. Preferred are a bisphenol A type epoxy resin, a bisphenol F type epoxy resin, a phenolic novolac type epoxy resin and a cresol novolac type epoxy resin. The epoxy resin used in the present invention is not restricted thereto and can be any epoxy resin known generally.

The polyguanidine used in the present invention is a polymer having, in the molecule, a plurality of guanidine groups represented by the following formula:

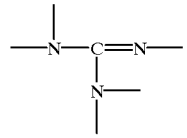

As the polyguanidine used in the present invention, a polyguanidine obtained by modifying a polycarbodiimide with an amine is preferred particularly.

As the polyguanidine obtained by modifying a polycarbodiimide with an amine, there can be mentioned, for example, a polyguanidine represented by the following formula:

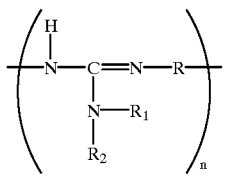

In the above formula, $R_1$ and $R_2$ are derived from the amine used for modification of polycarbodiimide and are each preferably a straight chain or branched chain alkyl group of 4 or more carbon atoms. Therefore, the amine used for modification of polycarbodiimide is preferably a dialkylamine having two straight chain or branched chain alkyl groups each of 4 or more carbon atoms. Incidentally, $R_1$ and $R_2$ are not necessarily the same and may be different from each other when different dialkylamines are used.

Above dialkylamine having two straight chain or branched chain alkyl groups each of 4 or more carbon atoms is exemplified by dibutylamine, dicyclohexylamine, dioctylamine and the like.

In the above formula, R is a bivalent organic group which is derived from the skeleton of the polycarbodiimide.

The polycarbodiimide used for obtaining the polyguanidine has a molecular weight of preferably 5,000 to 100,000. Naturally, therefore, the molecular weight of the polyguanidine is larger than the above-mentioned molecular weight of the polycarbodiimide by the amount of the amine added to the polycarbodiimide group. In the above formula, n is preferably an integer of 30 or more although it varies depending upon the skeleton of the polycarbodiimide used.

When the molecular weight of the polyguanidine used in the present invention is far smaller than 5,000, the resulting epoxy resin composition is difficult to handle when made into a film shape for use as a film-shaped adhesive and, more-over, has low stability in a solution state. When the molecular weight is far larger than 100,000, synthesis of the polycarbodiimide used for production of polyguanidine is difficult, making polyguanidine production difficult.

The polyguanidine used in the present invention can easily be synthesized by, for example, adding the dialkylamine to a solution of the polycarbodiimide so that the two components are the same equivalent, reacting the two components in an ambient temperature or under heating.

The one-pack type epoxy resin composition of the present invention comprises an epoxy resin having at least two epoxy groups in the molecule and a polyguanidine. The amount proportions of the two components can be, for example, 1 equivalent (epoxy resin) and 0.8 to 1.2 equivalents (polyguanidine).

When the amount of the polyguanidine is far smaller than 0.8 equivalent per equivalent of the epoxy resin, the crosslinking reaction taking place between the two components is insufficient and resultantly the subsequent curing is insufficient; moreover, the film produced from the composition has a low strength and makes the handling bad. When the amount of the polyguanidine is far larger than 1.2 equivalents, the crosslinking reaction is insufficient as well and resultantly the subsequent curing is insufficient.

The one-pack type epoxy resin composition of the present invention can be obtained by dissolving the polyguanidine in a solvent and mixing the solution with the epoxy resin with heating. There is no particular restriction as to the means for mixing and heating.

As to the kind of the solvent used, there is no particular restriction as long as the solvent can dissolve the polyguanidine and the epoxy resin. As the solvent, there can be mentioned, for example, toluene and tetrahydrofuran (THF). The obtained one-pack type epoxy resin composition of the present invention has a liquid form or a paste form.

The one-pack type epoxy resin composition of the present invention obtained in a liquid form or a paste form can be used as a film-shaped adhesive by casting the composition on an appropriate substrate and removing the solvent contained in the composition, or can be used as a sheet-shaped adhesive by coating or impregnating a base material, an unwoven fabric or the like with the composition.

The one-pack type epoxy resin composition of the present invention can further comprise, as necessary, components usable in ordinary adhesives, such as inorganic filler, rubber component, coloring material, plasticizer and the like, in amounts not impairing the properties of the composition.

The present invention is described in more detail below by way of Examples. However, the present invention is not restricted by these Examples.

POLYCARBODIIMIDE SYNTHESIS EXAMPLE 1

Into a 2-liter four-necked flask were fed 80.0 g of p-diphenylmethane diisocyanate (p-MDI), 984.0 ml of tetrahydrofuran and 0.16 g of a catalyst (3-methyl-1-phenyl-2-phosphorene-1-oxide). The resulting mixture was refluxed for 12 hours for a reaction. The reaction mixture was measured for infrared absorption spectrum (hereinafter referred to as IR). As a result, decrease in absorption due to isocyanate group and appearance of new absorption at 2120 $cm^{-1}$ were confirmed, and a solution of a polycarbodiimide derived from p-MDI was obtained.

POLYCARBODIIMIDE SYNTHESIS EXAMPLE 2

Into a 2-liter four-necked flask were fed 178.7 g of p-MDI, 0.76 g of phenyl isocyanate (PhI), 803.6 ml of tetrahydrofuran and 0.16 g of a catalyst (3-methyl-1-phenyl-2-phosphorene-1-oxide). The resulting mixture was refluxed for 16 hours for a reaction. The reaction mixture was measured for IR. As a result, decrease in absorption due to isocyanate group and appearance of new absorption at 2120 $cm^{-1}$ were confirmed, and a solution of a polycarbodiimide derived from p-MDI, blocked with PhI at the terminal was obtained.

POLYGUANIDINE SYNTHESIS EXAMPLE 1

There were mixed 100.0 g of the solution obtained in Polycarbodiimide Synthesis Example 1 and 4.39 g of dibutylamine [$(Bu)_2NH$]. The resulting mixture was subjected to a reaction at 60° C. for 3 hours. The reaction mixture was measured for infrared absorption spectrum (IR), which indicated disappearance of absorption of carbodiimide group (NCN) and appearance of new absorption attributed to guanidine group, at 1,620 $cm^{-1}$. Thereby, formation of a polyguanidine was confirmed.

POLYGUANIDINE SYNTHESIS EXAMPLE 2

There were mixed 100.0 g of the solution obtained in Polycarbodiimide Synthesis Example 1 and 8.30 g of dioctylamine [$(Oc)_2NH$]. The resulting mixture was subjected to a reaction at 60° C. for 1 hours. The reaction mixture was measured for infrared absorption spectrum (IR), which indicated disappearance of absorption of carbodiimide group (NCN) and appearance of new absorption attributed to guanidine group, at 1,620 cm$^{-1}$. Thereby, formation of a polyguanidine was confirmed.

POLYGUANIDINE SYNTHESIS EXAMPLE 3

There were mixed 100.0 g of the solution obtained in Polycarbodiimide Synthesis Example 2, 2.90 g of dioctylamine [(Oc)$_2$NH] and 1.60 g of dibutylamine [(Bu)$_2$NH]. The resulting mixture was subjected to a reaction at 70° C. for 3 hours. The reaction mixture was measured for infrared absorption spectrum (IR), which indicated disappearance of absorption of carbodiimide group (NCN) and appearance of new absorption attributed to guanidine group, at 1,620 cm$^{-1}$. Thereby, formation of a polyguanidine was confirmed.

EXAMPLE 1

6.00 g of a bisphenol A type epoxy resin was added to 100.0 g of the solution obtained in Polyguanidine Synthesis Example 1, to obtain a one-pack type epoxy resin composition.

EXAMPLE 2

5.80 g of a bisphenol A type epoxy resin was added to 100.0 g of the solution obtained in Polyguanidine Synthesis Example 2, to obtain a one-pack type epoxy resin composition.

EXAMPLE 3

6.00 g of a bisphenol A type epoxy resin was added to 100.0 g of the solution obtained in Polyguanidine Synthesis Example 3, to obtain a one-pack type epoxy resin composition.

EXAMPLE 4

5.90 g of a phenolic novolac type epoxy resin was added to 100.0 g of the solution obtained in Polyguanidine Synthesis Example 3, to obtain a one-pack type epoxy resin composition.

COMPARATIVE EXAMPLE 1

10.0 g of a bisphenol A type epoxy resin was mixed with 0.8 g of dicyandiamide, 0.8 g of a denatured aliphatic polyamine and 15.0 g of toluene, to obtain a solution.

COMPARATIVE EXAMPLE 2

100 g of the solution obtained in Polycarbodiimide Synthesis Example 1 was mixed with 5.0 g of a bisphenol A type epoxy resin to obtain a solution.

The one-pack type epoxy resin compositions obtained in Examples 1 to 4 and the solutions obtained in Comparative Examples 1 to 2 were tested for the following properties according to the following test methods. The results are shown in Table 1 and Table 2.

Film Formability

Each of the one-pack type epoxy resin compositions and the solutions was casted on a release film, and the resulting material was dried under reduced pressure and the solidified resin was separated. The resin was expressed as "o" when it was handleable as a film, and as "X" when it was not so.

Low-temperature Curability and Color of Cured Material

The solidified resin separated above was subjected to a heat treatment of 100° C.×3 hours. The resin was expressed as "o" when a cured material was obtained by the heat treatment, and as "X" when no cured material was obtained. When a cured material was obtained by the heat treatment, the color of the cured material was examined.

Storage Stability

Each of the one-pack type epoxy resin compositions and the solutions was allowed to stand at room temperature for 6 weeks. The adhesivities before and after the standing were compared. The storage stability of each composition or solution was expressed as "o" when there was no difference between the two adhesivities, and as "X" when the adhesivity after the standing was lower by 10% or less.

TABLE 1

|  | Ex. 1 | Ex. 2 | Ex. 3 | Ex. 4 | Comp. Ex. 1 | Comp. Ex. 2 |
| --- | --- | --- | --- | --- | --- | --- |
| Film formability |  |  | o | o | X | o |
| Low-temperature curability | o | o | o | o | o | X |
| Color of cured material | Colorless | Colorless | Colorless | Colorless | Brown | — |
| Storage stability | o | o | o | o | X | o |

Adhesion Strength

Each of the one-pack type epoxy resin compositions and the solutions was coated on an adherend, i.e. an aluminum foil of 25 mm in width and 0.5 mm in thickness. Two such adherends were laminated so that the composition or the solution was sandwiched in between the two adherends. The laminate was subjected to heating and pressurization under the following conditions to give rise to curing, whereby a test piece was prepared. The test piece was measured for T-peel strength using an autograph according to JIS K 6854.

|  | Temperature (° C.) | Time | Pressure applied (kg/cm$^2$) |
| --- | --- | --- | --- |
| Curing condition a | 130 | 5 min | 5 |
| Curing condition b | 80 | 6 hours | 5 |
| Curing condition c | 180 | 20 min | 5 |

TABLE 2

|  | Ex. 1 | Ex. 2 | Ex. 3 | Comp. Ex. 1 | Comp. Ex. 2 |
| --- | --- | --- | --- | --- | --- |
| Curing condition | a | a | a | b | c |
| Peeling strength (kg/cm$^2$) | 1.8 | 2.2 | 2.1 | 0.8 | 0.7 |

As is clear from the above Examples and Comparative Examples, the one-pack type epoxy resin composition of the present invention has high storage stability, can be made into a film, can be cured at a relatively low temperature of 100° C., and has high adhesivity.

What is claimed is:

1. A one-pack epoxy resin composition comprising an epoxy resin having at least two epoxy groups in the molecule and a polyguanidine having a molecular weight of from 5,000 to 100,000 which is obtained by modifying a polycarbodiimide with an amine.

2. A one-pack epoxy resin composition according to claim 1, wherein the polyguanidine is represented by the following formula:

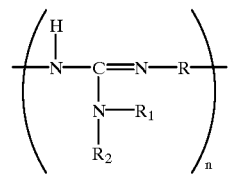

wherein $R_1$ and $R_2$ are each independently an residue of the amine used for modification of the polycarbodiimide; R is a bivalent organic group; and n is a value such that the polyguanidine has a molecular weight of from 5,000 to 100,000.

3. A one-pack epoxy resin composition according to claim 1, wherein the amount of the epoxy resin is 0.8 to 1.2 equivalents per equivalent of the polyguanidine.

* * * * *